United States Patent
Zhang et al.

(10) Patent No.: US 11,965,419 B2
(45) Date of Patent: Apr. 23, 2024

(54) MULTI-ENERGY COMPLEMENTARY SYSTEM FOR CO-ASSOCIATED ABANDONED MINE AND USE METHOD

(71) Applicant: ANHUI UNIVERSITY OF SCIENCE AND TECHNOLOGY, Huainan (CN)

(72) Inventors: Tong Zhang, Huainan (CN); Liang Yuan, Huainan (CN); Yanfang Li, Huainan (CN); Zegong Liu, Huainan (CN); Ming Tang, Huainan (CN); Xin Yang, Huainan (CN); Xiang Yu, Huainan (CN); Shuai Liu, Huainan (CN); Xin Lv, Huainan (CN)

(73) Assignee: ANHUI UNIVERSITY OF SCIENCE AND TECHNOLOGY, Anhui (CN)

( * ) Notice: Subject to any disclaimer, the term of this patent is extended or adjusted under 35 U.S.C. 154(b) by 0 days.

(21) Appl. No.: 17/795,413

(22) PCT Filed: Apr. 28, 2022

(86) PCT No.: PCT/CN2022/089992
§ 371 (c)(1),
(2) Date: Jul. 26, 2022

(87) PCT Pub. No.: WO2023/035631
PCT Pub. Date: Mar. 16, 2023

(65) Prior Publication Data
US 2023/0203947 A1    Jun. 29, 2023

(30) Foreign Application Priority Data
Sep. 8, 2021 (CN) .......................... 202111056099.3

(51) Int. Cl.
E21C 41/18    (2006.01)
E21F 15/08    (2006.01)
(Continued)

(52) U.S. Cl.
CPC .............. *E21C 41/18* (2013.01); *E21F 15/08* (2013.01); *E21B 41/0057* (2013.01);
(Continued)

(58) Field of Classification Search
CPC ......... E21F 15/00; E21F 15/005; E21F 15/08; E21C 41/16; E21C 41/18; E21C 41/22;
(Continued)

(56) References Cited

U.S. PATENT DOCUMENTS

| 4,317,492 A | 3/1982 | Summers et al. |
| 2015/0033738 A1* | 2/2015 | Hassani ................. E21F 15/00 60/641.2 |

(Continued)

FOREIGN PATENT DOCUMENTS

| CN | 102062052 A | 5/2011 | |
| CN | 103518050 A * | 1/2014 | ................ F02C 6/16 |

(Continued)

*Primary Examiner* — Abby J Flynn
*Assistant Examiner* — Michael A Goodwin
(74) *Attorney, Agent, or Firm* — Muncy, Geissler, Olds & Lowe, P.C.

(57) ABSTRACT

The present invention discloses a multi-energy complementary system for a co-associated abandoned mine and a use method. The multi-energy complementary system for a co-associated abandoned mine includes a mining mechanism, a grouting mechanism and an energy mechanism. In the present invention, the mining of coal and uranium resources is realized through the mining mechanism, the subsidence and seepage reduction of the stratum is realized through the grouting mechanism, and the effective utilization of waste resources is realized through the energy mechanism. Finally, with the efficient cooperation of the three mechanisms, safe and efficient development and utilization of co-associated resources in the full life cycle are realized, and the purposes of green and efficient mining of coal and uranium resources and secondary development of (Continued)

a coal seam goaf are achieved, thereby facilitating the realization of dual-carbon goals and the development of low-carbon green energy.

6 Claims, 1 Drawing Sheet

(51) Int. Cl.
| | | |
|---|---|---|
| E21B 41/00 | (2006.01) | |
| E21B 43/12 | (2006.01) | |
| E21B 43/29 | (2006.01) | |
| E21C 41/22 | (2006.01) | |
| H02J 15/00 | (2006.01) | |

(52) U.S. Cl.
CPC ............. *E21B 43/126* (2013.01); *E21B 43/29* (2013.01); *E21C 41/22* (2013.01); *H02J 15/006* (2013.01); *H02J 15/008* (2020.01)

(58) Field of Classification Search
CPC .. E21B 41/0057; E21B 43/126; E21B 43/129; E21B 43/28; E21B 43/29; H01J 15/00; H01J 15/003; H01J 15/006; H01J 15/008
See application file for complete search history.

(56) References Cited

U.S. PATENT DOCUMENTS

| | | | |
|---|---|---|---|
| 2021/0317739 A1* | 10/2021 | Ju | ............................. E21D 9/10 |
| 2021/0351615 A1* | 11/2021 | Yogev | ..................... F24S 10/74 |

FOREIGN PATENT DOCUMENTS

| | | | | |
|---|---|---|---|---|
| CN | 105370285 A | | 3/2016 | |
| CN | 106014344 A | | 10/2016 | |
| CN | 107317355 A | | 11/2017 | |
| CN | 108757282 A | | 11/2018 | |
| CN | 110738915 A | | 1/2020 | |
| CN | 110807608 A | | 2/2020 | |
| CN | 112160861 A | * | 1/2021 | ................ F02C 6/16 |
| CN | 113175325 A | | 7/2021 | |
| CN | 113202449 A | | 8/2021 | |
| CN | 113605892 A | | 11/2021 | |

* cited by examiner

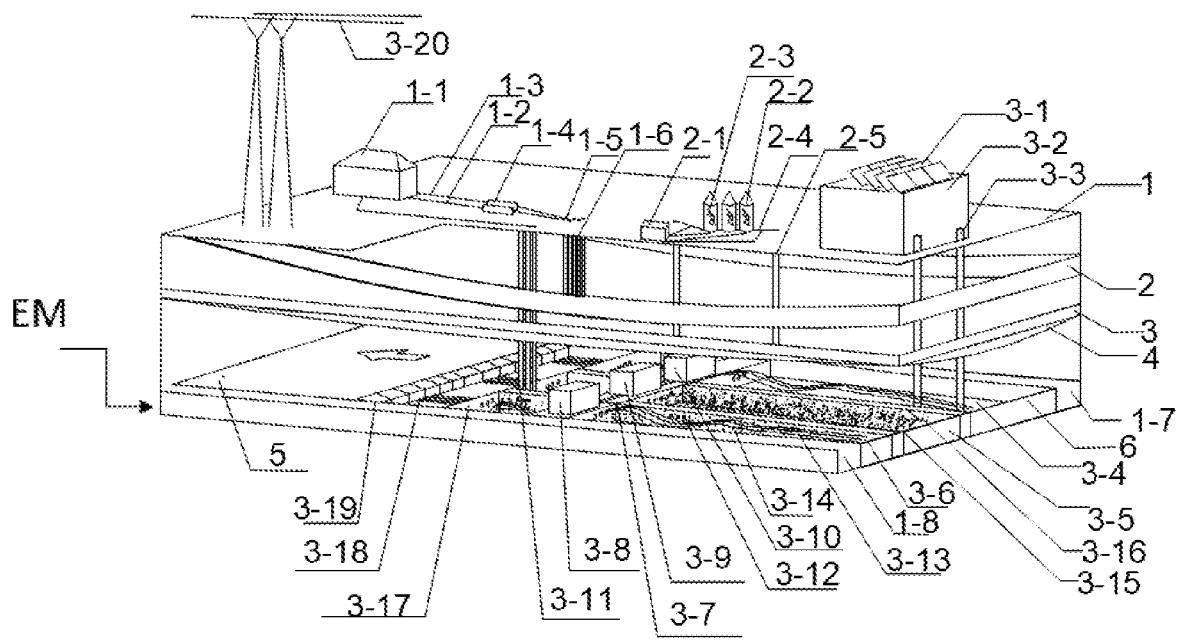

MULTI-ENERGY COMPLEMENTARY SYSTEM FOR CO-ASSOCIATED ABANDONED MINE AND USE METHOD

TECHNICAL FIELD

The present invention relates to a multi-energy complementary system for a co-associated abandoned mine and a method using the system.

BACKGROUND

Mineral resources such as coal and uranium are important energy sources for promoting national economic development. In the Ordos Basin, rich mineral resources such as coal, uranium and oil coexist. The precise and efficient mining of these mineral resources is of great significance to promoting the development of the energy industry in China. However, at present, many resource development is still dominated by single mining, and the overlapping areas of resources cannot be used effectively and accurately. The resource mining of coal, as the main fossil energy in China, is indispensable. However, in the process of coal mining, coal seam mining leads to the movement and destruction of the overlying rock, which will deform and destroy the gathering and transportation pipelines in the overlapping areas of mining, thereby affecting the mining and utilization of other mineral resources. Therefore, a multi-resource coordinated mining method is urgently needed to solve the problems in single mining. In addition, abandoned coal mines have rich space and energy resources, so how to recycle the abandoned coal mines is also of great significance. Based on the above situation, a multi-energy complementary system for a co-associated abandoned mine is urgently needed to achieve the safe, efficient, green and coordinated development of co-associated resources and simultaneously realize the secondary development and utilization of a coal seam goaf, thereby facilitating the realization of dual-carbon goals and the development of low-carbon green energy.

SUMMARY

The present invention realizes the coordinated mining of coal and uranium through a mining mechanism based on green mining. In the present invention, the mining of coal and uranium resources is realized through a mining mechanism, the subsidence and seepage reduction of the stratum is realized through a grouting mechanism, and the effective utilization of waste resources is realized through an energy mechanism. Finally, with the efficient cooperation of the three mechanisms, safe and efficient development and utilization of co-associated resources in the full life cycle are realized, and the purposes of green and efficient mining of coal and uranium resources and secondary development of a coal seam goaf are achieved, thereby facilitating the realization of dual-carbon goals and the development of low-carbon green energy. To achieve the above purpose, the present invention uses the following technical solutions:

A multi-energy complementary system for a co-associated abandoned mine is provided, including:
a mining mechanism, comprising a comprehensive storage station, a uranium transport pipe, a liquid transport pipe, a pump, a pumping shaft, a pumping pipe, a return airway, a haulage gateway, a surface layer, an ore-bearing aquifer, and a coal seam; a grouting mechanism, comprising solid waste slurry, a comprehensive pump chamber, a comprehensive treatment station, a mixed slurry pipe, a grouting pipe, a key layer, and a separation area; and an energy mechanism, comprising a solar panel, an above-ground water storage tank, a water pumping pipe, an underground reservoir, a compressed energy storage room, an underground photovoltaic electrolytic cell, a cable, a central control room I, a central control room II, a central control room III, a gas collecting pipe, a delivery pipe, $H_2$, $H_2O$, air, $CH_4$, a modeling plate, a transmission pipeline, a mining and filling face, a smart grid and a goaf, wherein the ore-bearing aquifer is located below the surface layer, the key layer is located between the ore-bearing aquifer and the coal seam, the separation area is located at a lower part of the key layer, the goaf and the mining and filling face are arranged in the coal seam, the return airway and the haulage gateway are located in the coal seam and are arranged on two sides of the mining and filling face, the surface layer is provided with the comprehensive storage station, the pump, the comprehensive pump chamber, the comprehensive treatment station and the above-ground water storage tank sequentially from left to right, the smart grid is arranged on the surface layer and is located in front of the comprehensive storage station, a lower end of the pumping pipe is arranged in the ore-bearing aquifer, an upper end of the pumping pipe is connected with the pumping shaft, the uranium transport pipe and the liquid transport pipe are connected with the comprehensive storage station, the pump and the pumping shaft sequentially from left to right, the grouting pipe is arranged in the separation area, two ends of the mixed slurry pipe are connected with the comprehensive treatment station and the grouting pipe respectively, the comprehensive pump chamber is connected with the mixed slurry pipe and the comprehensive treatment station, the solid waste slurry is placed in the comprehensive treatment station, a lower end of the water pumping pipe is arranged in the underground reservoir, an upper end of the water pumping pipe is arranged in the above-ground water storage tank, the solar panel is arranged on the above-ground water storage tank, the compressed energy storage room is arranged in the middle of the goaf and is adjacent to the underground reservoir and the underground photovoltaic electrolytic cell, the central control room I, the central control room II and the central control room III are arranged in the underground photovoltaic electrolytic cell, the compressed energy storage room and the underground reservoir respectively, the cable is connected with the central control room I, the central control room II and the central control room III, the mining and filling face is connected with the modeling plate through the transmission pipeline, the gas collecting pipe is connected with the compressed energy storage room and the comprehensive storage station, and the underground photovoltaic electrolytic cell is connected with the compressed energy storage room through the delivery pipe.

Preferably, the solid waste slurry is placed in the separation area and the modeling plate respectively through the grouting pipe and the transmission pipeline.

Preferably, the underground reservoir, the compressed energy storage room and the underground photovoltaic electrolytic cell are respectively arranged in the goaf.

Preferably, the underground reservoir is connected with the above-ground water storage tank through the water pumping pipe and is connected with the central control room III.

Preferably, the compressed energy storage room has the $H_2$, the $CH_4$ and the air, is connected with the central control room II, and is connected with the comprehensive storage station through the gas collecting pipe.

Preferably, the underground photovoltaic electrolytic cell is connected with the solar panel through the central control room I, and is connected with the compressed energy storage room through the delivery pipe.

Preferably, the smart grid is connected with the solar panel, the central control room I, the central control room II and the central control room III. The present invention also provides a use method of a multi-energy complementary system for a co-associated abandoned mine. The method uses the above system and includes the following working steps:

- a: based on engineering geological exploration, obtaining geological occurrence states of the ore-bearing aquifer and the coal seam, and arranging the pumping shaft, the return airway, the haulage gateway, and the like sequentially;
- b: according to engineering geological conditions and mining mechanism arrangement conditions, reasonably arranging the comprehensive storage station, the pumping pipe, the comprehensive treatment station, the comprehensive pump chamber, the mixed slurry pipe, the above-ground water storage tank and the solar panel;
- c: arranging the haulage gateway, the return airway and the mining and filling face in the coal seam, and arranging the underground reservoir, the compressed energy storage room and the underground photovoltaic electrolytic cell in the goaf;
- d: based on the determination condition of a grouting level, reasonably arranging the grouting pipe, and controlling the grouting pressure;
- e: injecting the mixture slurry into the separation area through the grouting pipe, and after the slurry is precipitated, removing water and retaining ash to form a saturated compacted body to support the upper key layer, thereby forming a carrier of "separation area filler+coal pillar+key layer" to support overlying rock of the coal seam;
- f: diverting mine water after the mining of the coal seam to the underground reservoir or the underground photovoltaic electrolytic cell in the goaf, storing gas produced by the mining of the coal seam in the compressed energy storage room in the goaf, generating electrical energy through the central control room II, then using the electrical energy for pumping and storing the water in the underground reservoir to the above-ground water storage tank through the water pumping pipe, when the electrical energy is needed, discharging the water to the underground reservoir through the water pumping pipe to convert the generated potential energy difference into the electrical energy to form a circulating power generation system, transmitting the surplus electrical energy to the smart grid, and at the same time, transmitting exhaust gas in the compressed energy storage room to the comprehensive storage station through the gas collecting pipe for uranium mining;
- g: electrolyzing water in the underground photovoltaic electrolytic cell through the electrical energy generated by the solar panel to generate the $H_2$ which is transmitted to the compressed energy storage room through the delivery pipe, and transmitting the surplus electrical energy to the smart grid; and
- h: mining coal and uranium at the same time, operating the pump and the grouting mechanism synchronously, performing water pumping energy storage, air compression energy storage and photovoltaic electrolysis of water to produce hydrogen at the same time, transmitting a uranium ore solution to the comprehensive storage station through the pumping shaft, performing a separation grouting operation synchronously by the grouting mechanism, transmitting the $H_2$ to the compressed energy storage room through the delivery pipe, transmitting the exhaust gas in the compressed energy storage room to the comprehensive storage station through the gas collecting pipe for uranium mining, and transmitting the surplus electrical energy to the smart grid at the same time.

The present invention has the following advantages:

The multi-energy complementary system for a co-associated abandoned mine mentioned in the present invention is provided with the mining mechanism, the grouting mechanism and the energy mechanism. According to the geological occurrence conditions of co-associated resources, coal and uranium mining mechanisms are reasonably arranged, and coal and uranium are transported to the comprehensive storage station. After the coal seam is mined, in the separation space formed by the overlying rock, the mixture slurry is processed through the comprehensive treatment station and is injected into the separation layer below the key layer through the grouting pipe. After the slurry is precipitated, water is removed and ash is retained to form a saturated compacted body to support the upper key layer, thereby forming a carrier of "separation area filler+coal pillar+key layer", which can effectively protect the upper stratum and the aquifer and ensure that the upper rock formation and the ground are not damaged and deformed. The goaf after coal seam mining is fully used and divided into a water storage space and a gas storage space, mine water and gas after coal seam mining are converted into electrical energy by a water pumping energy storage technology and an air compression energy storage technology, and a stable power supply system is formed. In combination with a photovoltaic power generation technology, a part of the water is electrolyzed to produce hydrogen for replenishing the gas in the compressed energy storage room, and the exhaust gas in the compressed energy storage room is transported to the comprehensive storage station through the gas collecting pipe for uranium mining. At the same time, the surplus electrical energy is transmitted to the smart grid to form a multi-energy complementary system for a co-associated abandoned mine and a use system.

BRIEF DESCRIPTION OF THE DRAWINGS

The sole FIGURE is an overall state diagram in an example of the present invention.

In the FIGURE: 1 denotes surface layer; 2 denotes ore-bearing aquifer; 3 denotes key layer; 4 denotes separation area; 5 denotes coal seam; 6 denotes goaf; 1-1 denotes comprehensive storage station; 1-2 denotes uranium transport pipe; 1-3 denotes liquid transport pipe; 1-4 denotes pump; 1-5 denotes pumping shaft; 1-6 denotes pumping pipe; 1-7 denotes return airway; 1-8 denotes haulage gateway; 2-1 denotes comprehensive pump chamber; 2-2 denotes comprehensive treatment station; 2-3 denotes solid waste slurry; 2-4 denotes mixed slurry pipe; 2-5 denotes grouting pipe; 3-1 denotes solar panel; 3-2 denotes above-ground water storage tank; 3-3 denotes water pumping pipe; 3-4 denotes underground reservoir; 3-5 denotes compressed energy storage room; 3-6 denotes underground photovoltaic electrolytic cell; 3-7 denotes cable; 3-8 denotes central control room I; 3-9 denotes central control room II; 3-10 denotes central control room III; 3-11 denotes gas collecting pipe; 3-12 denotes delivery pipe; 3-13 denotes $H_2$; 3-14 denotes $H_2O$; 3-15 denotes air; 3-16 denotes $CH_4$; 3-17 denotes modeling plate; 3-18 denotes transmission pipeline; 3-19 denotes mining and filling face; and 3-20 denotes smart grid.

DETAILED DESCRIPTION

As shown in the sole figure, a multi-energy complementary system for a co-associated abandoned mine includes a mining mechanism, a grouting mechanism and an energy mechanism. The subsidence and seepage reduction of the stratum is realized through the grouting mechanism, and the effective utilization of waste resources is realized through the energy mechanism. Finally, with the efficient cooperation of the three mechanisms, safe and efficient development and utilization of co-associated resources in the full life cycle are realized, and the purposes of green and efficient mining of coal and uranium resources and secondary development of a coal seam goaf are achieved, thereby facilitating the realization of dual-carbon goals and the development of low-carbon green energy.

In the mining mechanism, the ore-bearing aquifer 2 is arranged below the surface layer 1, the comprehensive storage station 1-1 and the pump 1-4 are arranged on the surface layer 1, the return airway 1-7 and the haulage gateway 1-8 are located in the coal seam 5 and are arranged on two sides of the mining and filling face 3-19, a lower end of the pumping pipe 1-6 is arranged in the ore-bearing aquifer 2, an upper end of the pumping pipe 1-6 is connected with the pumping shaft 1-5, and the uranium transport pipe 1-2 and the liquid transport pipe 1-3 are connected with the comprehensive storage station 1-1, the pump 1-4 and the pumping shaft 1-5 sequentially.

In the grouting mechanism, the key layer 3 is located between the ore-bearing aquifer 2 and the coal seam 5, the separation area 4 is located at a lower part of the key layer 3, the comprehensive pump chamber 2-1 and the comprehensive treatment station 2-2 are arranged on the surface layer 1, two ends of the mixed slurry pipe 2-4 are connected with the comprehensive treatment station 2-2 and the grouting pipe 2-5 respectively, the comprehensive pump chamber 2-1 is connected with the mixed slurry pipe 2-4 and the comprehensive treatment station 2-2, and the solid waste slurry 2-3 is placed in the comprehensive treatment station 2-2.

In the energy mechanism EM, the goaf 6 is arranged in the coal seam 5, the mining and filling face 3-19 is arranged in the coal seam 5, the smart grid 3-20 is arranged on the surface layer 1 and is located in front of the comprehensive storage station 1-1, a lower end of the water pumping pipe 3-3 is arranged in the underground reservoir 3-4, an upper end of the water pumping pipe 3-3 is arranged in the above-ground water storage tank 3-2, the above-ground water storage tank 3-2 is arranged on the surface layer 1, the solar panel 3-1 is arranged on the above-ground water storage tank 3-2, the compressed energy storage room 3-5 is arranged in the middle of the goaf 6 and is adjacent to the underground reservoir 3-4 and the underground photovoltaic electrolytic cell 3-6, the central control room I 3-8, the central control room II 3-9 and the central control room III 3-10 are arranged in the underground photovoltaic electrolytic cell 3-6, the compressed energy storage room 3-5 and the underground reservoir 3-4 respectively, the cable 3-7 is connected with the central control room I 3-8, the central control room II 3-9 and the central control room III 3-10, the mining and filling face 3-19 is connected with the modeling plate 3-17 through the transmission pipeline 3-18, the gas collecting pipe 3-11 is connected with the compressed energy storage room 3-5 and the comprehensive storage station 1-1, and the underground photovoltaic electrolytic cell 3-6 is connected with the compressed energy storage room 3-5 through the delivery pipe 3-12.

The specific steps are roughly as follows:
a: based on engineering geological exploration, geological occurrence states of the ore-bearing aquifer 2 and the coal seam 5 are obtained, and the pumping shaft 1-5, the return airway 1-7, the haulage gateway 1-8, and the like are arranged sequentially;
b: according to engineering geological conditions and mining mechanism arrangement conditions, the comprehensive storage station 1-1, the pumping pipe 1-6, the comprehensive treatment station 2-2, the comprehensive pump chamber 2-1, the mixed slurry pipe 2-4, the above-ground water storage tank 3-2 and the solar panel 3-1 are reasonably arranged;
c: the haulage gateway 1-8, the return airway 1-7 and the mining and filling face 3-19 are arranged in the coal seam 5, and the underground reservoir 3-4, the compressed energy storage room 3-5 and the underground photovoltaic electrolytic cell 3-6 are arranged in the goaf 6;
d: based on the determination condition of a grouting level, the grouting pipe 2-5 is reasonably arranged, and the grouting pressure is controlled;
e: the mixture slurry 2-4 is injected into the separation area 4 through the grouting pipe 2-5, and after the slurry is precipitated, water is removed and ash is retained to form a saturated compacted body to support the upper key layer, thereby forming a carrier of "separation area filler+coal pillar+key layer" to support the overlying rock of the coal seam 5;
f: mine water after the mining of the coal seam 5 is diverted to the underground reservoir 3-4 or the underground photovoltaic electrolytic cell 3-6 in the goaf 6, gas produced by the mining of the coal seam 5 is stored in the compressed energy storage room 3-5 in the goaf 6, electrical energy is generated through the central control room II 3-9, then the electrical energy is used for pumping and storing the water in the underground reservoir 3-4 to the above-ground water storage tank 3-2 through the water pumping pipe 3-3, when the electrical energy is needed, the water is discharged to the underground reservoir 3-4 through the water pumping pipe 3-3 to convert the generated potential energy difference into the electrical energy to form a circulating power generation system, the surplus electrical energy is transmitted to the smart grid 3-20, and at the same time, exhaust gas in the compressed energy storage room 3-5 is transmitted to the comprehensive storage station 1-1 through the gas collecting pipe 3-11 for uranium mining;
g: water is electrolyzed in the underground photovoltaic electrolytic cell 3-6 through the electrical energy generated by the solar panel 3-1 to generate the $H_2$ 3-13 which is transmitted to the compressed energy storage room 3-5 through the delivery pipe 3-12, and the surplus electrical energy is transmitted to the smart grid 3-20; and h: coal and uranium are mined at the same time, the pump 1-4 and the grouting mechanism are operated synchronously, water pumping energy storage, air compression energy storage and photovoltaic electrolysis of water to produce hydrogen are performed at the same time, a uranium ore solution is transmitted to the comprehensive storage station 1-1 through the pumping shaft 1-5, a separation grouting operation is performed synchronously by the grouting mechanism, the $H_2$ 3-13 is transmitted to the compressed energy storage room 3-5 through the delivery pipe 3-12, the exhaust gas in the compressed energy storage room 3-5 is transmitted to the comprehensive storage station 1-1 through the gas collecting pipe 3-11 for uranium mining, and the surplus electrical energy is transmitted to the smart grid 3-20 at the same time.

The above examples are only a description of the preferred embodiment of the present invention, not a limitation of the scope of the present invention. Without departing from the spirit of the design of the present invention, all kinds of variants and improvements made to the technical solutions of the present invention by those of ordinary skill in the art shall fall within the scope of protection determined by the claims of the present invention.

What is claimed is:

1. A multi-energy complementary system for a co-associated abandoned mine, wherein the multi-energy complementary system for a co-associated abandoned mine comprises:
    a mining mechanism, comprising:
        a storage unit;
        a uranium transport pipe;
        a liquid transport pipe;
        a pump;
        a coal seam;
        a return airway located in the coal seam,
        a haulage gateway located in the coal seam,
        a surface layer;
        an ore-bearing aquifer located below the surface layer; and
        a pumping pipe having a lower end arranged in the ore-bearing aquifer;
    a grouting mechanism, comprising:
        solid waste slurry;
        a pump chamber;
        a treatment unit;
        a key layer located between the ore-bearing aquifer and the coal seam;
        a separation area located at a lower part of the key layer;
        a grouting pipe arranged in the separation area; and
        a mixed slurry pipe having a first end connected with the treatment unit and a second end connected with the grouting pipe; and
    an energy mechanism, comprising:
        an above-ground water storage tank;
        a solar panel arranged on the above-ground water storage tank;
        an underground reservoir;
        an underground space in which electrolysis occurs;
        a water pumping pipe having a lower end arranged in the underground reservoir and an upper end arranged in the above-ground water storage tank;
        a goaf arranged in the coal seam;
        a compressed energy storage unit arranged in a middle of the goaf and adjacent to the underground reservoir and the underground space;
        a gas collecting pipe connected with the compressed energy storage unit and the storage unit;
        a delivery pipe connecting the compressed energy storage unit with the underground space;
    wherein the surface layer is sequentially provided with the storage unit, the pump, the pump chamber, the treatment unit and the above-ground water storage tank,
    wherein the uranium transport pipe and the liquid transport pipe are sequentially connected with the storage unit and the pump,
    wherein the pump chamber is connected with the mixed slurry pipe and the treatment unit, and
    wherein the solid waste slurry is placed in the treatment unit.

2. The multi-energy complementary system for a co-associated abandoned mine according to claim 1, wherein the solid waste slurry is placed in the separation area through the grouting pipe.

3. The multi-energy complementary system for a co-associated abandoned mine according to claim 1, wherein the underground reservoir, the compressed energy storage unit and the underground space are respectively arranged in the goaf.

4. The multi-energy complementary system for a co-associated abandoned mine according to claim 1, wherein the underground reservoir is connected with the above-ground water storage tank through the water pumping pipe.

5. The multi-energy complementary system for a co-associated abandoned mine according to claim 1, wherein the compressed energy storage unit is connected with the storage unit through the gas collecting pipe.

6. The multi-energy complementary system for a co-associated abandoned mine according to claim 1, wherein the underground space is connected with the solar panel and is connected with the compressed energy storage room through the delivery pipe.

* * * * *